United States Patent
Glenn et al.

(10) Patent No.: US 9,688,933 B2
(45) Date of Patent: Jun. 27, 2017

(54) CHARCOAL-FOAM HEATING MATERIAL

(75) Inventors: Gregory M. Glenn, American Canyon, CA (US); Syed Hussain Imam, Walnut Creek, CA (US); Artur Klamczynski, Orinda, CA (US)

(73) Assignee: The United States of America, as represented by The Secretary of Agriculture, Washington, DC (US)

( * ) Notice: Subject to any disclaimer, the term of this patent is extended or adjusted under 35 U.S.C. 154(b) by 1128 days.

(21) Appl. No.: 12/558,146

(22) Filed: Sep. 11, 2009

(65) Prior Publication Data

US 2010/0257780 A1   Oct. 14, 2010

(51) Int. Cl.
  *C10L 5/44*   (2006.01)
  *C10L 5/14*   (2006.01)
  *C10L 5/36*   (2006.01)

(52) U.S. Cl.
  CPC  *C10L 5/44* (2013.01); *C10L 5/14* (2013.01); *C10L 5/361* (2013.01); *C10L 5/365* (2013.01); *Y02E 50/10* (2013.01); *Y02E 50/30* (2013.01)

(58) Field of Classification Search
  USPC .............................. 44/65, 542, 550, 568, 598
  See application file for complete search history.

(56) References Cited

U.S. PATENT DOCUMENTS

| | | | |
|---|---|---|---|
| 3,302,999 A | | 2/1967 | Mitchell |
| 3,960,763 A | | 6/1976 | Lambou et al. |
| 4,128,513 A | | 12/1978 | Errede et al. |
| 4,166,749 A | * | 9/1979 | Sterrett et al. ............... 106/675 |
| 4,225,318 A | * | 9/1980 | Wrigley, Jr. ................... 44/270 |
| 4,373,955 A | * | 2/1983 | Bouchard et al. ............ 106/646 |
| 4,477,259 A | * | 10/1984 | Funk ............................... 44/280 |
| 4,541,833 A | * | 9/1985 | Mueller .......................... 44/562 |
| 4,906,254 A | * | 3/1990 | Antosko ......................... 44/520 |
| 4,957,555 A | * | 9/1990 | Wheeler et al. .............. 106/716 |
| 5,203,629 A | * | 4/1993 | Valle et al. ....................... 366/2 |
| 5,421,836 A | * | 6/1995 | Ross ............................... 44/560 |

OTHER PUBLICATIONS

Adopo N'komin, Aidoph bom, Gerard Antonini, Olivier Francois, "The deashed charcoal-oil-water mixture: a liquid fuel for biomass energetical valorization", The Chemical Engineering Journal, 60, 49-54.*

* cited by examiner

*Primary Examiner* — Ellen McAvoy
*Assistant Examiner* — Ming Cheung Po
(74) *Attorney, Agent, or Firm* — John D. Fado; Robert D. Jones

(57) ABSTRACT

The charcoal-foam heating material is formed by combining a charcoal mixture with an aqueous surfactant and water to create a semi-homogenous charcoal-foam slurry. The slurry is poured into shaping molds so that the slurry dries into the charcoal-foam heating material. In the preferred embodiment, a concrete surfactant is used during the mixing process and the charcoal-foam slurry is formed into briquettes and used as a cooking fuel.

21 Claims, No Drawings

CHARCOAL-FOAM HEATING MATERIAL

FIELD OF THE INVENTION

The present invention relates to a charcoal heating material. Specifically, the invention relates to a combination of surfactants and a conventional charcoal mixture prepared so that the combination may be fashioned into a charcoal heating material that ignites without the use of charcoal lighter fluid.

BACKGROUND OF THE INVENTION

Charcoal briquettes are used by millions of consumers as a means of cooking food outdoors. Foods cooked with charcoal have a unique, flavor and wide appeal. Commonly available charcoal briquettes have a high density and provide a slow-burning fuel with a high BTU output. The charcoal briquettes' dense structure and low porosity keep the charcoal burning slowly for an extended period of time.

However, one of the shortcomings of conventional charcoal briquettes is that the briquettes are difficult to ignite and may not continue to burn, even after they appear to have been ignited. To address this problem, conventional charcoal manufactures often spray the briquettes with a petroleum solvent to create "easy-to-light" briquettes. More commonly, charcoal lighter fluid is used to ignite the briquettes. Both of these processes require the use of flammable petroleum-based materials. Petroleum-based materials are not renewable (i.e. "green") and may impart unwanted flavors and chemicals to the meat. Furthermore, the use of charcoal lighter fluid has been identified as a source of air pollution in urban areas.

In the case of traditional charcoal lighter fluid, the fluid is commonly stored in a user's home, where it has the potential to be misused or ingested by children. Multiple burn injuries occur every year because people use too much of the lighter fluid, or allow the lighter fluid to get on their hands or clothes. The lighter fluid is then inadvertently ignited as a user smokes a cigarette or attempts to light the briquettes.

The need exists for a charcoal cooking material that does not rely on a volatile petroleum-based lighter fluid or solvent to ignite and sustain a fire. The current invention comprises a foamed, lightweight charcoal that may be formed into traditional charcoal briquettes or other suitable cooking and heating forms. The foamed charcoal of the current invention comprises a closed, thin-walled porous and permeable charcoal structure that facilitates the flow of oxygen to the ignited portions of the charcoal and thereby enables the briquettes to ignite easily and quickly without the use of petroleum products.

SUMMARY OF THE INVENTION

The current invention is directed to a charcoal-foam heating material. The heating material includes an aqueous surfactant in combination with water and a charcoal mixture so that discrete, aggregated composite charcoal-foam masses are formed.

The current invention is also directed to a method of making charcoal-foam heating material. An aqueous surfactant is combined with water and a charcoal mixture to form a charcoal slurry. The charcoal slurry is then thoroughly mixed and whipped to form a wet charcoal-foam slurry that is poured into shaping molds to dry. The wet charcoal-foam slurry eventually dries, thereby forming discrete, aggregate composite charcoal-foam masses that comprise the charcoal-foam heating material. In the preferred embodiment, the charcoal foam masses comprise charcoal-foam briquettes.

DETAILED DESCRIPTION OF PREFERRED EMBODIMENTS

The present invention comprises a charcoal-foam heating material with cooking qualities superior to traditional charcoal briquettes.

The charcoal-foam material is formed by combining water with a surfactant (i.e. a foaming agent) to create a water/surfactant foaming composition. The water/surfactant composition is then combined with a crushed and/or powdered charcoal mixture and thoroughly agitated, mixed, and whipped to create a semi-homogenous wet charcoal-foam slurry.

The wet charcoal-foam slurry is then poured into shaping molds and allowed to dry in a drying chamber so that a dried charcoal-foam product is ultimately formed. In alternative embodiments, the drying process may be controlled by varying the environmental conditions in the drying chamber or by modifying the temperature of the shaping molds. For example, the pressure, temperature, and relative humidity in the drying chamber may be varied, and the shaping molds themselves may be heated or cooled.

The crushed and/or powdered charcoal mixture provides a structural basis for the formation of discrete aggregated composite charcoal-foam masses. In the preferred embodiment, the shaping molds form the charcoal-foam masses into the form of conventional charcoal briquettes. In alternative embodiments, the charcoal-foam masses may be formed into logs, cubes, other geometric forms, or any discrete shape known in the art consistent with the intended use of the charcoal product.

The charcoal mixture of the preferred embodiment is comprised primarily of traditional charcoal ingredients but may contain other additives including (but not limited to) coal, a binding agent (typically starch made from corn, milo, or wheat), an accelerant (such as nitrate), an ash whitening agent (such as lime), and other ingredients to enhance the characteristics and performance of the material.

The density and heating characteristics of the charcoal-foam material may be controlled by varying the ratio and types of surfactants (and resulting foams) used in the charcoal-foam mixing process. For example, a user may want a charcoal fire that burns at a high temperature for a relatively short period of time to cook (for example) hot dogs or hamburgers. In this case, a relatively high ratio of foam to charcoal would be advantageous so that an optimal amount of oxygen would reach the burning portion of, the charcoal material.

Alternatively, a user may want a relatively slow burning charcoal fire to (for example) "smoke" a large portion of meat. In this case, a relatively low ratio of foam to charcoal would be advantageous. Further, the charcoal-foam material may be subjected to varying amounts of compression and/or decompression/vacuum during the drying process to further vary and thereby customize the cooking and heating characteristics of the resulting charcoal-foam product. Increasing the density of the charcoal-foam product generally increases the product's burn time, while decreasing the density has the opposite effect.

In essence, the current invention allows a manufacturer to customize the heating characteristics and burn time of the charcoal-foam product based on the heating or cooking needs of a targeted consumer. The ability of a consumer to purchase a charcoal cooking or heating product specifically designed to meet his or her needs represents a significant advantage over currently-available conventional charcoal products.

While a variety of surfactants may be used in the formation of the charcoal-foam slurry, the inventors have found that the surfactants associated with lightweight concrete mixes unexpectedly yield the best charcoal-foam slurry and result in the creation of a superior product. For the purpose of this specification, concrete surfactants are defined as aqueous surfactants used in the production of concrete. In the preferred embodiment, protein-based concrete surfactants are used. In alternative embodiments, the surfactants may have a synthetic base or other chemical compositions.

In at least one embodiment, the concrete surfactant comprises a polypeptide-alkylene polyol condensate. Other concrete surfactants such as inorganic salts, sodium lauryl sulfate, and sodium dodecyl sulfate may also be used.

The use of a charcoal-foam product as a cooking material comprises a limitation relevant to the current invention. Specifically, the designation of a product as a "cooking material" limits the types of surfactants that may be used to create the charcoal-foam product. Surfactants used in the manufacture of a charcoal-foam cooking material must be thoroughly tested to ensure that they do not impart toxic chemicals to cooked foods.

Examples of concrete surfactants that may be used to produce the charcoal-foam heating product of the current invention are shown in Table 1. Some of these surfactants may also be used in the production of charcoal-foam cooking material.

TABLE 1

Concrete Surfactants

1. MEARLCRETE FOAM LIQUID ™: An aqueous concentrate of a surface-active Polypeptide-Alkylene polyol condensate, specially formulated to yield tough, stable, voluminous micro bubbled foam. (http://www.cellular-concrete.com/mearlcrete.htm)
2. GREENFROTH ™: A protein foaming agent for light weight cellular concrete (foamed concrete) (www.greenfroth.com).
3. EABASSOC ™ Concrete Foaming Agent: a highly concentrated, highly efficient, low dosage liquid which is quick acting and easy to incorporate into a concrete mix. It is fed with water into an EABASSOC Foam Generator to produce stable, stiff foam which resists collapse.
4. Noraite PA-1: formed using a PORTAFOAM ™ generator is a protein-based foaming agent suitable for making foamed concrete in the lower density range (eg. 800 kg/m$^3$).
5. Other surfactants such as Inorganic salts (NaCl + Na$_2$SO$_4$), Sodium Lauryl Sulfate, and Sodium Dodecyl Sulfate.

In operation, the charcoal-foam material of the current invention provides a closed, thin-walled porous and permeable material structure that facilitates the flow of oxygen to the ignited portions of the burning charcoal, thereby increasing oxygen penetration and promoting easy and prompt ignition.

For the foregoing reasons, it is clear that the invention provides an innovative charcoal-foam heating and cooking material. As described supra, the invention may be modified in multiple ways and applied in various technological applications. For example, in alternative embodiments, the charcoal-foam product may be formed into logs and used as a long-burning heating fuel in a well-ventilated area. Further, a variety of additives may be used to impart a predetermined flavor to cooked items and further enhance the heating/cooking qualities of the charcoal-foam product.

As also described supra, the invention may be customized as required by a specific operation or application, and the individual components may be modified and defined, as required, to achieve the desired result. Although the materials of construction are generally described, they may include a variety of compositions consistent with the function of the invention. Such variations are not to be regarded as a departure from the spirit and scope of the invention, and all such modifications as would be obvious to one skilled in the art are intended to be included within the scope of the following claims.

What is claimed is:

1. A combustible solid charcoal foam heating material comprising:
   a surfactant; and
   a charcoal mixture,
   wherein the surfactant is combined with the charcoal mixture to form the combustible solid foam charcoal heating material having a solid foam porous and permeable structure that facilitates the flow of oxygen to ignited portions of the combustible charcoal foam heating material so that the combustible solid charcoal heating material does not contain petroleum-based lighter fluid or petroleum-based solvents.

2. The charcoal heating material of claim 1 wherein the surfactant comprises a foaming agent.

3. The charcoal heating material of claim 1 wherein the surfactant is a concrete surfactant.

4. The charcoal heating material of claim 1 wherein the charcoal heating material comprises a cooking material.

5. The charcoal heating material of claim 1 wherein the charcoal heating material is structured so that a user controls a burn time of the charcoal heating material by specifying a ratio of the charcoal mixture to the surfactant and water.

6. The charcoal heating material of claim 1 wherein the charcoal heating material further comprises additives.

7. The charcoal heating material of claim 6 wherein the additives comprise coal, a binder, an accelerant, and lime.

8. The charcoal heating material of claim 7 wherein the binder is a starch.

9. The charcoal heating material of claim 8 wherein the starch is derived from a source selected from a group consisting of corn, milo, or wheat.

10. The charcoal heating material of claim 1 wherein the surfactant has a protein base.

11. The charcoal heating material of claim 1 wherein the surfactant comprises a polypeptide-alkylene polyol condensate.

12. The charcoal heating material of claim 1 wherein the surfactant comprises one of: inorganic salts, sodium lauryl sulfate, and sodium dodecyl sulfate.

13. The charcoal heating material of claim 4 wherein the cooking material is formed into briquettes.

14. A method of making combustible solid charcoal heating material,
   the method comprising the steps of:
      providing a surfactant;
      adding the surfactant to water;
      combining a charcoal mixture with the surfactant and water;
      mixing the charcoal mixture, surfactant, and water to form a wet charcoal slurry;
      pouring the wet charcoal slurry into a shaping mold; and
      drying the charcoal slurry so that solid charcoal heating material comprises a combustible solid foam porous and permeable charcoal structure that facilitates the flow of oxygen to ignited portions of the combustible charcoal foam heating material, the combustible charcoal foam heating material does not contain petroleum-based lighter fluid or petroleum-based solvents.

15. The method of claim 14 wherein, in the combining step, the surfactant is a concrete surfactant.

16. The method of claim 14 wherein, in the combining step, the surfactant is a foaming agent.

17. The method of claim 14 wherein, in the providing, adding and combining steps, a ratio of the charcoal mixture to the surfactant and water is varied so that the charcoal heating material has a predetermined burn time.

18. The method of claim 14 wherein the charcoal heating material comprises a charcoal cooking material.

19. The method of claim 14 wherein, in the providing step, the charcoal mixture comprises crushed charcoal, coal, a binder, an accelerant, and lime.

20. A combustible solid charcoal foam heating material consisting essentially of: a surfactant, charcoal, and a binding agent; the combustible charcoal foam heating material consisting of a thin-walled porous and permeable charcoal structure that facilitates the flow of oxygen to ignited portions of the combustible charcoal foam heating material.

21. A combustible solid charcoal foam heating material consisting of: a surfactant, charcoal, a binding agent, an ash whitening agent, and an accelerant; the combustible charcoal foam heating material consisting of a thin-walled porous and permeable charcoal structure that facilitates the flow of oxygen to ignited portions of the combustible charcoal foam heating material.

* * * * *